(12) United States Patent
Mason et al.

(10) Patent No.: US 11,426,754 B2
(45) Date of Patent: Aug. 30, 2022

(54) FLUID FEED RING AND ASSOCIATED APPARATUS AND METHOD

(71) Applicant: JOHNSON MATTHEY PUBLIC LIMITED COMPANY, London (GB)

(72) Inventors: Daniel Mason, Wayne, PA (US); Paul Obelcz, Wayne, PA (US); Daniel Troland, Wayne, PA (US)

(73) Assignee: Johnson Matthey Public Limited Company, London (GB)

( * ) Notice: Subject to any disclaimer, the term of this patent is extended or adjusted under 35 U.S.C. 154(b) by 281 days.

(21) Appl. No.: 16/832,269

(22) Filed: Mar. 27, 2020

(65) Prior Publication Data
US 2020/0316638 A1 Oct. 8, 2020

Related U.S. Application Data

(60) Provisional application No. 62/825,040, filed on Mar. 28, 2019.

(51) Int. Cl.
*B05C 5/02* (2006.01)
*B05C 11/00* (2006.01)
*B01D 53/94* (2006.01)
*B01J 35/04* (2006.01)
*B01J 37/02* (2006.01)

(52) U.S. Cl.
CPC .............. *B05C 5/02* (2013.01); *B01D 53/94* (2013.01); *B01J 35/04* (2013.01); *B01J 37/0215* (2013.01); *B05C 11/00* (2013.01); *B01D 2255/903* (2013.01); *B01D 2255/9155* (2013.01)

(58) Field of Classification Search
None
See application file for complete search history.

(56) References Cited

U.S. PATENT DOCUMENTS

| 3,948,213 | A | * | 4/1976 | Hoyer | B01J 23/40 118/428 |
| 4,557,773 | A | | 12/1985 | Bonzo | |
| RE33,481 | E | * | 12/1990 | Ziecker | B05C 5/02 425/7 |
| 5,182,140 | A | * | 1/1993 | Watanabe | C04B 41/009 427/244 |
| 2001/0042506 | A1 | * | 11/2001 | Hogan | B05B 7/10 118/300 |

(Continued)

FOREIGN PATENT DOCUMENTS

| DE | 102014107773 A1 | 12/2014 |
| EP | 2992952 A1 | 3/2016 |

(Continued)

*Primary Examiner* — Jethro M. Pence

(57) ABSTRACT

A fluid feed ring (5), a substrate coating apparatus (1) and a method are provided for coating a substrate (2) with a catalyst component. The fluid feed ring (5) comprises an annular body (40) having an inner face (45) bounding a central bore of the fluid feed ring. A fluid feed port (47) receives the liquid and a plurality of outlet apertures (50) on the inner face of the annular body discharge the liquid onto a piston face (23) of the substrate coating apparatus (1). A distribution channel (51) extending at least part-way around the annular body (40) provides fluid communication between the fluid feed port (47) and the plurality of outlet apertures (50).

11 Claims, 8 Drawing Sheets

(56) References Cited

U.S. PATENT DOCUMENTS

| | | | |
|---|---|---|---|
| 2007/0102841 A1* | 5/2007 | Bondeson | B05C 5/027 |
| | | | 425/465 |
| 2012/0021896 A1* | 1/2012 | Nakano | B05C 7/02 |
| | | | 502/100 |
| 2014/0290568 A1* | 10/2014 | Aoki | B05B 7/0075 |
| | | | 239/565 |
| 2014/0356530 A1 | 12/2014 | Roberts et al. | |
| 2016/0263525 A1* | 9/2016 | Bose | B01J 8/0257 |
| 2018/0043389 A1* | 2/2018 | Gramiccioni | F26B 21/006 |
| 2019/0382296 A1* | 12/2019 | Cheng | A61L 2/26 |

FOREIGN PATENT DOCUMENTS

| | | |
|---|---|---|
| EP | 3003582 B1 | 8/2017 |
| JP | 2009233595 A | 10/2009 |
| JP | 5925101 B2 | 5/2016 |
| WO | 9947260 A1 | 9/1999 |
| WO | 2011080525 A1 | 7/2011 |

* cited by examiner

FLUID FEED RING AND ASSOCIATED APPARATUS AND METHOD

The present disclosure relates to a fluid feed ring, a substrate coating apparatus and a method for coating a substrate with a catalyst component. The coated substrate may be for use in an emissions control device for treating or removing pollutants from an exhaust gas produced by an internal combustion engine.

BACKGROUND TO THE DISCLOSURE

Large numbers of emissions control devices comprising coated monolithic substrates are manufactured each year. One of the principal uses of such devices is for the treatment of exhaust gases, such as the exhaust gases produced by a power plant or by an internal combustion engine, particularly a vehicular internal combustion engine. The monolithic substrate contains a plurality of channels that bring the exhaust gas into contact with a coating on the channel walls within the substrate. This coating may trap, oxidise and/or reduce constituents of the exhaust gas that are hazardous to human health or that are environmentally unfriendly. The monolithic substrate may also be a filter substrate, which can remove soot (i.e. particulate matter), such as the soot produced by internal combustion engines.

A substrate for purification of exhaust gases may typically comprise a monolithic substrate that is provided with passages for the through-flow of exhaust gases. The substrate may be provided with a coating, which may be a catalytic coating. The coating may be applied to the substrate as a washcoat that is passed through the passages of the substrate. Various methods for applying the coating to a substrate are known. One such method involves applying washcoat to a first face of the substrate (e.g. an upper face) and subjecting an opposite, second face (e.g. a lower face) of the substrate to at least a partial vacuum to achieve movement of the washcoat through the passages. After coating the substrate may be dried and calcined.

The substrate may be configured as a flow-through substrate wherein each passage is open at both the first and second faces of the substrate and the passage extends through the whole length of the substrate. Consequently, exhaust gases entering through a first face of the substrate into a passage pass through the substrate within the same passage until the exhaust gases exit a second face of the substrate. Alternatively, the substrate may be configured as a filter substrate, in which some passages are plugged at a first face of the substrate and other passages are plugged at a second face of the substrate. In such a configuration, exhaust gases entering through a first face of the substrate into a first passage flow along that first passage part-way along the substrate and then pass through a filtering wall of the substrate into a second passage. The exhaust gases then pass along said second passage and out of a second face of the substrate. Such an arrangement has become known in the art as a wall-flow filter.

The coated filter substrate or product may, for example, be a filter substrate comprising an oxidation catalyst (e.g. a catalysed soot filter [CSF]), a selective catalytic reduction (SCR) catalyst (e.g. the product may then be called a selective catalytic reduction filter [SCRF] catalyst), a NOx adsorber composition (e.g. the product may then be called a lean NOx trap filter [LNTF]), a three-way catalyst composition (e.g. the product may then be called a gasoline particulate filter [GPF]), an ammonia slip catalyst [ASC] or a combination of two or more thereof (e.g. a filter substrate comprising a selective catalytic reduction (SCR) catalyst and an ammonia slip catalyst [ASC]).

The substrate may be coated in a single dose wherein washcoat may be applied to the substrate in a single step with the substrate remaining in a single orientation. Alternatively, the substrate may be coated in two doses. For example, in a first dose the substrate is in a first orientation with a first face uppermost and a second face is lowermost. A coating is applied to the first face and coats a portion of the length of the substrate. The substrate is then inverted so that the second face is uppermost. A coating is then applied to the second face in order to coat the portion of the substrate that was uncoated by the first dose. Beneficially, a two-dose process may allow different coatings to be applied to each end of the substrate.

To provide best performance of the substrate it may be beneficial to ensure that the substrate is fully coated so that the surface area of the coated substrate is maximised. However, it may also beneficial to ensure that portions of the substrate are not coated by more than one layer of washcoat (for example, in a two-dose process) as this can lead to increased pressure loss within the substrate. It is therefore desirable that the process of applying the washcoat to substrates achieves reliable and controllable coating profiles of the substrates.

EP 3 003 582 B1 describes a method of coating a substrate with a washcoat liquid comprising a catalyst component, which substrate comprises a plurality of channels, wherein the method comprises: (a) holding the substrate vertically; (b) introducing the liquid into the substrate through the open ends of the channels at a lower end of the substrate; and (c) after the lower end of the substrate has been part-filled with the liquid, applying a vacuum to the open ends of the channels at the upper end of the substrate while introducing the liquid into the substrate.

An example substrate coating apparatus for carrying out such a method is shown in FIG. 1 of EP 3 003 582 B1 and comprises a substrate holder 3, a piston arrangement 4, a side dosing port 7 and a vacuum generator 6.

The substrate holder 3 is suitable for holding a substrate 2 vertically, the substrate 2 being of the type comprising a plurality of channels. The substrate holder 3 may comprise an inflatable upper seal bladder 10 and an inflatable lower seal bladder 11 that support respective upper and lower ends of the substrate 2. The piston arrangement 4 is provided for introducing, by pushing or injecting, a liquid comprising a catalyst component into the substrate 2 via or through open ends of the plurality of channels at the lower end of the substrate. The vacuum generator 6 is provided for applying a vacuum to open ends of the plurality of channels at the upper end of the substrate 2. The side dosing port 7 is suitable for supplying the liquid onto a piston 20 of the piston arrangement 4.

In the arrangement the side dosing port 7 comprises a single port through which the liquid comprising the catalyst component is discharged into a delivery chamber 21 above the piston 20.

If the washcoat liquid comprising the catalyst component is not evenly distributed on the piston when the piston arrangement introduces, by pushing or injecting, the liquid containing the catalyst component then uneven coating of the substrate may result. For example, the coating profile of the substrate may be uneven with some channels of the substrate being coated with more catalyst component than other channels. For example, this may lead to a non-flat leading edge of the coating profile. In the particular case of a two-dose process, a non-flat leading edge of the coating profile may lead to portions of the substrate not being adequately coated with and other portions of the substrate being coated by more than one layer of washcoat.

SUMMARY OF THE DISCLOSURE

The present disclosure describes a substrate coating apparatus that comprises a fluid feed ring and a method for coating a substrate with a catalyst component. The method may comprise one or more steps of the method described in EP 3 003 582 B1. However, the substrate coating apparatus and method are not limited to use in such a method. Further, the substrate coating apparatus and the fluid feed ring of the present disclosure may find application with other methods of coating a substrate with a catalyst component.

In a first aspect the present disclosure provides a fluid feed ring for supplying a liquid comprising a catalyst component onto a piston face of a substrate coating apparatus, the fluid feed ring comprising:

an annular body comprising an inner face bounding a central bore of the fluid feed ring;

a fluid feed port for receiving the liquid;

a plurality of outlet apertures on the inner face of the annular body for discharging the liquid onto the piston face; and a distribution channel extending at least part-way around the annular body which provides fluid communication between the fluid feed port and the plurality of outlet apertures.

The provision of a plurality of outlet apertures on the inner face of the annular body for discharging the liquid onto the piston face may improve the evenness of spread of the liquid on the piston face. Further, use of the plurality of outlet apertures may allow for faster cycle times for the substrate coating apparatus since the liquid may be supplied at a faster rate onto the piston face and/or the liquid requires less time to evenly spread across the piston face before being pushed or injected into the channels of the substrate.

The plurality of outlet apertures may be provided in at least two quadrants of the inner face; optionally in at least three quadrants of the inner face; optionally in all four quadrants of the inner face; and optionally wherein the plurality of outlet apertures may be arranged around the full extent of the inner face; and optionally wherein the plurality of apertures may be equi-spaced around the full extent of the inner face.

Distributing the outlet apertures around the inner face in such manner may further improve the evenness of spread of the liquid on the piston face.

The fluid feed ring may further comprise a plurality of outlet channels that provide fluid communication from the distribution channel to the plurality of outlet apertures; and optionally wherein at least a portion of, and optionally all of, the plurality of outlet channels may be directed downwards at their respective outlet apertures such that the liquid discharged from said outlet channels through said outlet apertures is directed downwards towards the piston face; and optionally wherein a first portion of said outlet channels may be directed downwards at a first angle and a second portion of said outlet channels may be directed downwards at a second angle, and optionally a third portion of said outlet channels may be directed downwards at a third angle.

Directing the plurality of outlet channels downwards may assist in preventing loss of liquid off the piston face by assisting in containing the liquid within the confines of the inner face of the annular body. Further, directing the plurality of outlet channels downwards at a first angle and a second angle and optionally also at a third angle may improve the evenness of spread of the liquid on the piston face by targeting first and second, and optionally third, zones of the piston face with the liquid. For example, central and/or intermediate and/or peripheral zones of the piston face may be targeted with the liquid. This may, in particular, assist in preventing uncoated portions of the piston face, for example in a central zone of the piston face.

In some embodiments the plurality of outlet channels may be all either directed clockwise or all directed anti-clockwise at their respective outlet apertures such that the liquid discharged from said outlet channels through said outlet apertures may be all directed initially clockwise or all directed initially anti-clockwise onto the piston face.

A first portion of said outlet channels may be directed clockwise or anti-clockwise at a first angle to the radial direction and a second portion of said outlet channels may be directed clockwise or anti-clockwise at a second angle to the radial direction.

Providing outlet channels angled at at least a first angle to the radial direction and a second angle to the radial direction may improve the evenness of spread of the liquid on the piston face.

In some embodiments a first subset of the plurality of outlet channels may be directed clockwise at their respective outlet apertures such that the liquid discharged from said outlet channels through said outlet apertures may be directed initially clockwise onto the piston face. Further, a second subset of the plurality of outlet channels may be directed anti-clockwise at their respective outlet apertures such that the liquid discharged from said outlet channels through said outlet apertures may be directed initially anti-clockwise onto the piston face. Further, a third subset of the plurality of outlet channels may be directed at an angle from 0° to 10°, preferably 0° to 4° to the radial direction at their respective outlet apertures such that the liquid discharged from said outlet channels through said outlet apertures may be directed initially substantially radially onto the piston face.

Providing some outlet channels that are directed clockwise at their respective outlets and some outlet channels that are directed anti-clockwise at their respective outlets may improve the evenness of spread of the liquid on the piston face. For example, the counter-rotating flows of liquid may collide with one another increasing the degree of spread of the liquid across the piston face. The optional provision of some outlet channels directed at an angle from 0° to 10°, preferably 0° to 4° to the radial direction at their respective outlet apertures may provide for even greater evenness of spread of the liquid on the piston face. For example, provision of such outlet channels may improve flow of liquid into the central zone of the piston face. The provision of a third subset of the plurality of outlet channels directed at an angle from 0° to 10°, preferably 0° to 4° to the radial direction at their respective outlet apertures may be preferred where an internal diameter of the annular body is over 200 mm. For annular bodies with an internal diameter of 200 mm or less it may be preferred to provide only the first subset and the second subset of the plurality of outlet channels.

The first and/or second subsets of the plurality of outlet channels that are directed clockwise or anti-clockwise may be directed to swirl initially in a peripheral zone of the piston face.

The third subset of the plurality of outlet channels that are directed at an angle from 0° to 10°, preferably 0° to 4° to the radial direction may comprise a first portion of said third subset which are directed downwards at a first angle to target a central zone of the piston face and a second portion of said third subset which are directed downwards at a second angle, being greater than the first angle, to target an intermediate zone of the piston face.

The fluid feed port may be located at a periphery of the fluid feed ring; and optionally wherein the fluid feed port may comprise a feed channel that extends through an outer face of the annular body into communication with the distribution channel; and optionally wherein the distribution channel at the location of intersection with the feed channel may comprise a non-apertured section to thereby deflect sideways all of the liquid entering the distribution channel from the feed channel.

In a second aspect the present disclosure provides a substrate coating apparatus comprising:

a substrate holder for holding a substrate vertically, the substrate being of the type comprising a plurality of channels;

a piston for introducing, by pushing or injecting, a liquid comprising a catalyst component into the substrate via or through open ends of the plurality of channels at a lower end of the substrate;

a vacuum generator for applying a vacuum to open ends of the plurality of channels at an upper end of the substrate; and a fluid feed ring according to the first aspect for supplying the liquid onto a face of the piston.

The fluid feed ring may be mounted below the substrate holder for holding the substrate vertically; and optionally wherein the piston may be reciprocally movable within a delivery chamber and the fluid feed ring may be mounted at or above an upper end of the delivery chamber; and optionally wherein the fluid feed ring may be mounted in between the delivery chamber and a lower part of the substrate holder for holding a substrate vertically.

In a third aspect the present disclosure provides a method of coating a substrate with a liquid comprising a catalyst component, the substrate being of the type comprising a plurality of channels, the method comprising:

(a) holding the substrate vertically;
(b) supplying the liquid onto a face of a piston using the fluid feed ring of the first aspect;
(c) introducing the liquid into the substrate by pushing or injecting the liquid through open ends of the plurality of channels at a lower end of the substrate with the piston; and
(d) after the lower end of the substrate has been part-filled with the liquid, applying a vacuum to open ends of the plurality of channels at an upper end of the substrate while introducing the liquid into the substrate in step (c).

In step (b) the liquid may be supplied from at least two quadrants of the fluid feed ring; optionally from at least three quadrants of the fluid feed ring; optionally from all four quadrants of the fluid feed ring.

In step (b) the liquid may be directed downwards towards the piston face; and optionally wherein a first portion of the liquid may be directed downwards at a first angle and a second portion of the liquid may be directed downwards at a second angle, and optionally a third portion of the liquid may be directed downwards at a third angle.

In some embodiments in step (b) the liquid may be all directed initially clockwise or all directed initially anti-clockwise onto the piston face; and optionally wherein, in step (b) a first portion of the liquid may be directed clockwise or anti-clockwise at a first angle and a second portion of the liquid may be directed clockwise or anti-clockwise at a second angle.

In some embodiments a first volume of the liquid may be directed initially clockwise onto the piston face; and/or wherein a second volume of the liquid may be directed initially anti-clockwise onto the piston face; and/or wherein a third volume of the liquid may be directed initially substantially radially onto the piston face. The first volume and/or the second volume of liquid may be directed to swirl initially in a peripheral zone of the piston face. A first portion of the third volume of the liquid which may be directed initially radially onto the piston face may also be directed downwards at a first angle to target a central zone of the piston face and a second portion of the third volume of the liquid which may be directed initially radially onto the piston face may be directed downwards at a second angle, being greater than the first angle, to target an intermediate zone of the piston face.

BRIEF DESCRIPTION OF THE DRAWINGS

Embodiments of the present disclosure will now be described, by way of example only, with reference to the accompanying drawings, in which.

DETAILED DESCRIPTION

Emissions control devices for treating or removing pollutants in an exhaust gas produced by a combustion engine are well known in the art. Such devices typically comprise a substrate coated with a catalyst component. The present disclosure finds particular application for use in preparing such devices.

The present disclosure relates to coating a substrate with a liquid comprising a catalyst component using a substrate coating apparatus and method. It is to be understood that the "catalyst component" is not limited to being a chemical compound or material that is catalytically active in a reaction involving a pollutant component of an exhaust (e.g. CO, HC or NOx). The term "catalyst component" embraces any component that is normally applied in washcoat for inclusion in a catalyst or emissions control device. For example, the catalyst component can refer to a material that is able to store or absorb NOx or hydrocarbon. However, it is preferred that the "catalyst component" is itself catalytically active.

Liquids comprising a catalyst component are known to those skilled in the art and include: aqueous solutions of platinum group metal compounds, such as platinum, palladium and rhodium compounds, aqueous solutions of alkali metal and alkaline earth metal compounds for depositing compounds for absorbing NOx on the substrates, and other components such as compounds of transition metals e.g. iron, copper, vanadium, cerium and transition metal catalyst promoter compounds; washcoat slurries including particulate catalyst support materials such as alumina, ceria, titania, zirconia, silica-alumina and zeolites, optionally supporting one or more of the above mentioned platinum group metals or transition metals; and washcoat slurries containing combinations of supported metal compounds and aqueous solutions of the above mentioned metal compounds. Such liquids can also include relevant acids, organic compound thickeners etc. to improve the catalyst activity, chemistry of the formulation to suit the intended purpose of the resulting catalyst, and/or the viscosity and rheology of the liquid. The liquid may be a solution or a suspension, but commonly the liquid is a suspension.

Figure 1:
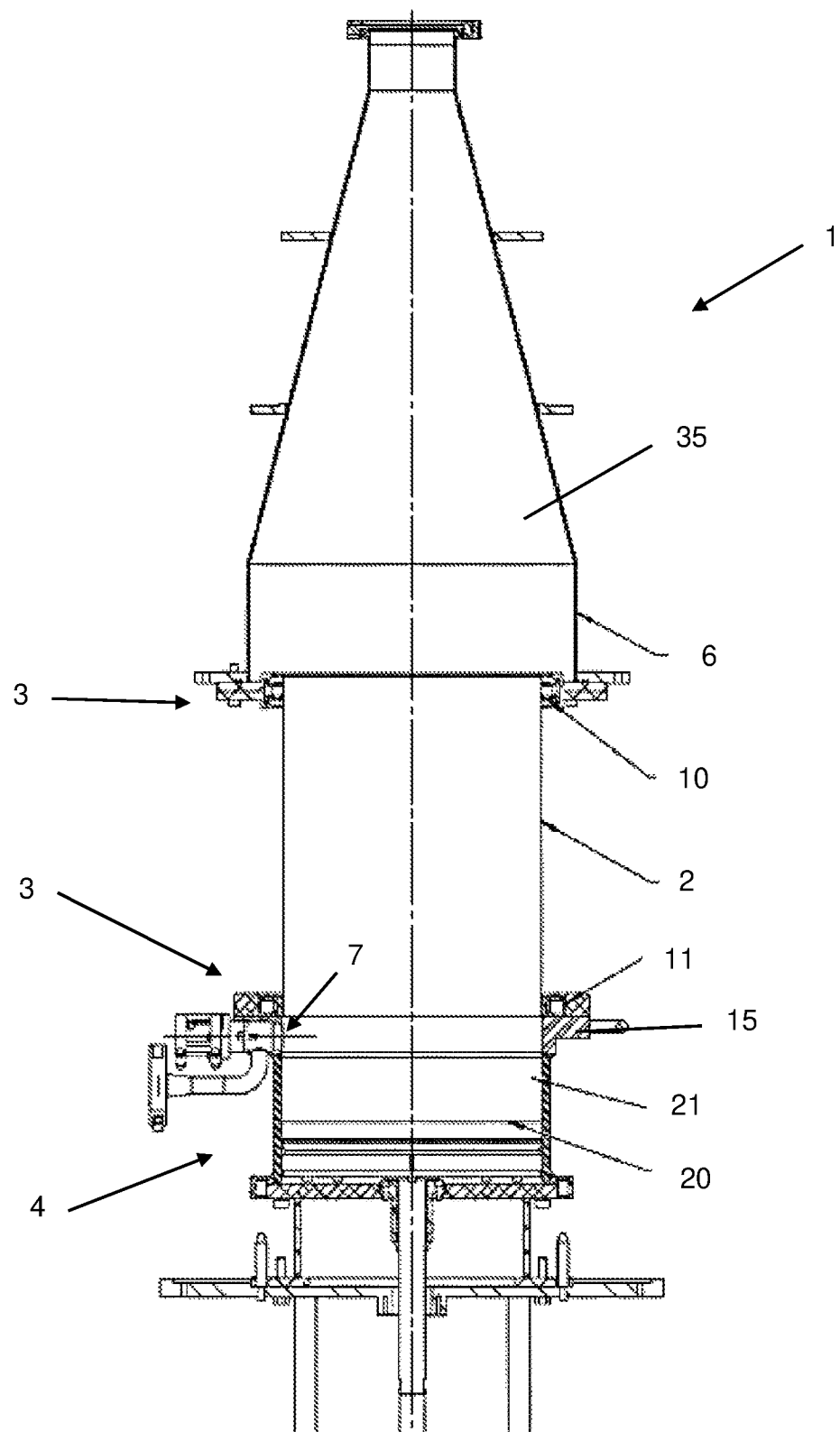
FIG. 1 is a diagram of a prior art substrate coating apparatus.

Substrate coating apparatus 1 and methods are described in EP 3 003 582 B1, the contents of which are incorporated by reference in their entirety. The main parts of the substrate coating apparatus of EP 3 003 582 B1 are shown in FIG. 1, and comprise a substrate holder 3, a piston arrangement 4, a fluid feed ring 15 and a vacuum generator 6. The fluid feed ring 15 is provided with a single side dosing port 7 through which the liquid comprising the catalyst component is discharged into a delivery chamber 21 above the piston 20.

According to the present disclosure the present inventors have developed a new fluid feed ring 5 for use in a substrate coating apparatus and methods. The new fluid feed ring 5 may be used in place of the fluid feed ring 15 in substrate coating apparatus 1 and methods of the type described in EP 3 003 582 B1. However, the new fluid feed ring 5 may be used as part of other substrate coating apparatus and methods as will be understood by the skilled reader and is therefore not limited to use in the apparatus and methods of EP 3 003 582 B1.

In the following, by way of example only, a description of the new fluid feed ring 5 will be provided for use as part of the substrate coating apparatus 1 and methods of the general type described in EP 3 003 582 B1. For a fuller description of the other parts of the substrate coating apparatus 1 and methods the skilled reader is directed to the teaching of EP 3 003 582 B1.

At a functional level the substrate holder 3 preferably holds the substrate 2 vertically—the substrate 2 being of the type comprising a plurality of channels. The piston 20 functions to introduce—by pushing or injecting—a liquid comprising a catalyst component into the substrate 2 via or through open ends of the plurality of channels at a lower end of the substrate 2. The vacuum generator 6 functions to apply a vacuum to open ends of the plurality of channels at an upper end of the substrate 2. The new fluid feed ring 5, which in the following will be referred to as 'fluid feed ring' 5 for simplicity functions to supply the liquid onto a piston face 23 of the piston 20.

The substrate holder 3 may comprise an inflatable upper seal bladder 10 (also called an upper inflatable collar) and/or an inflatable lower seal bladder 11 (also called a lower inflatable collar) of the type described in EP 3 003 582 B1 that support respective upper and lower ends of the substrate 2. The inflatable upper seal bladder 10 and the inflatable lower seal bladder 11 may contact and/or engage with an exterior surface of the substrate 2. Each may form a liquid or air tight seal around the substrate 2. The inflatable upper seal bladder 10 and the inflatable lower seal bladder 11 may be supported by one or more housings (e.g. supported by an internal wall of the one or more housings). Not all substrates have a conventional circular cross-section, and some may have an oval or "race-track", skewed oval or other asymmetric cross-section. Whatever the cross-section of the substrate, it is possible to adopt a suitably shaped housing for receiving the substrate using conventional methods or techniques. The inflatable lower seal bladder 11 may hold the substrate 2 in position while liquid is introduced into the lower end of the substrate 2. It may also provide a barrier that prevents the liquid from coating an exterior surface at a side of the substrate 2.

Figure 4:
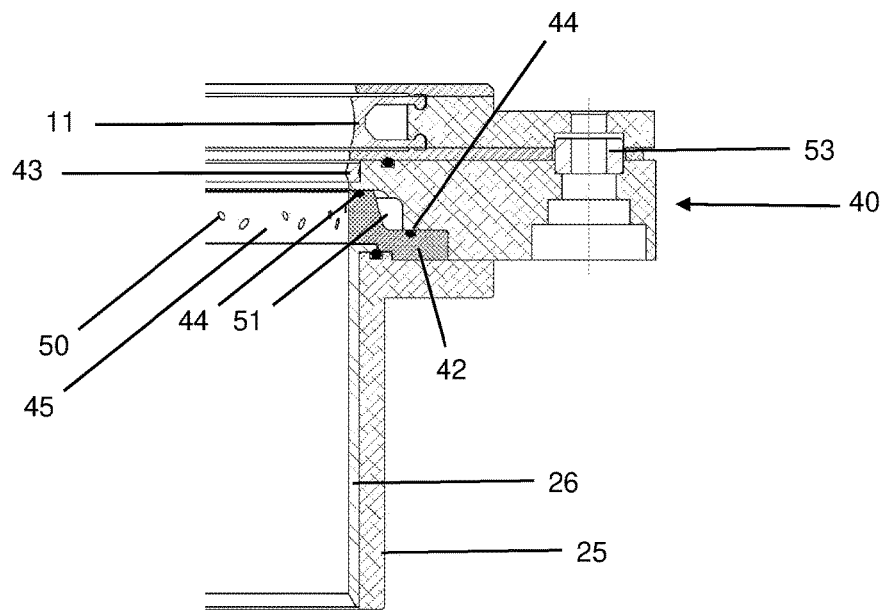
FIG. 4 is a cross-sectional view of a portion of the sub-assembly of FIG. 2 taken on a different plane to that of FIG. 3.
Figure 5:
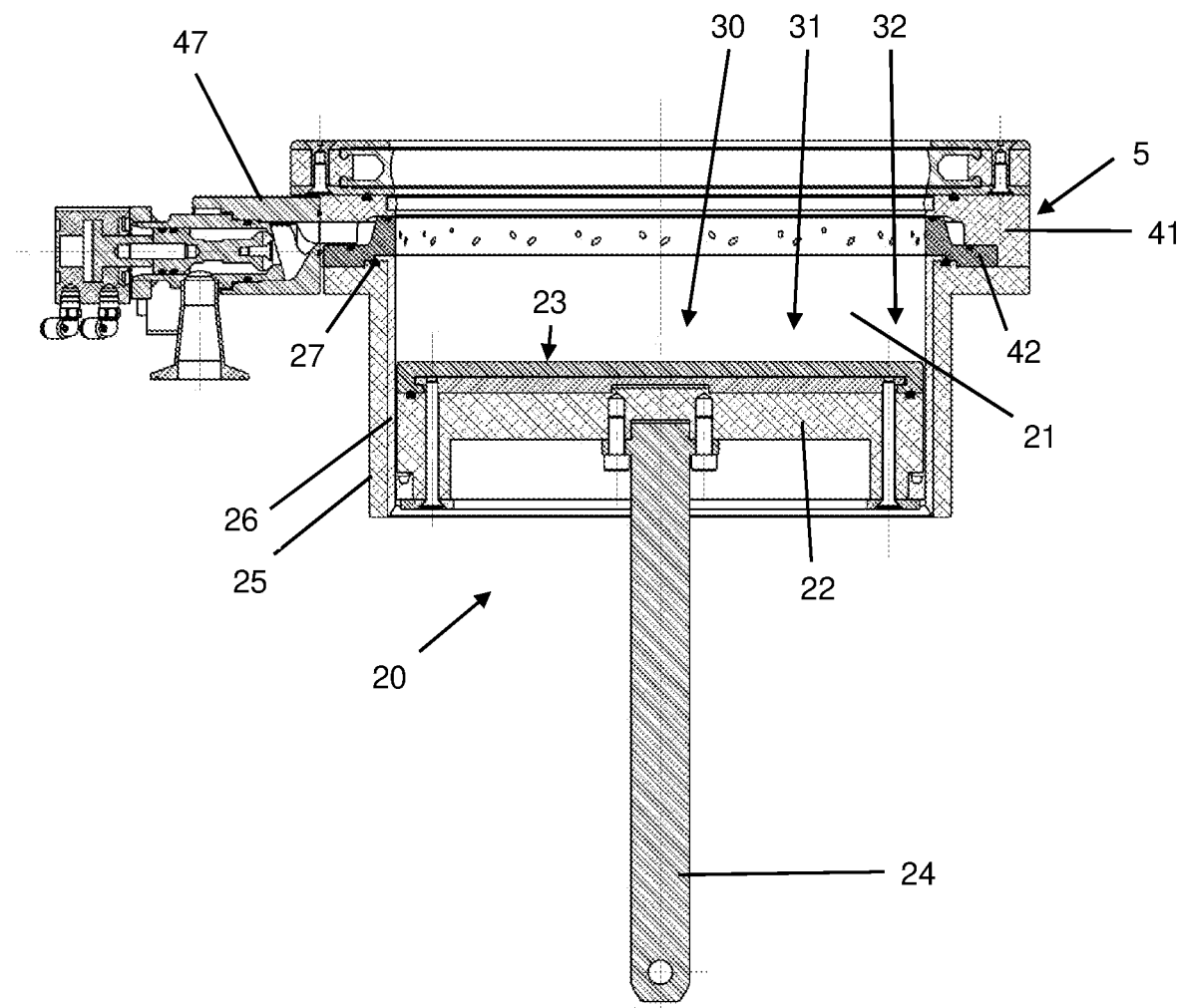
FIG. 5 is a cross-sectional view of a sub-assembly of the substrate coating apparatus according to the present disclosure including a piston arrangement.

As shown in FIG. 5, the piston arrangement 4 may comprise a piston 20 and a housing in which the piston 20 reciprocates. As shown in FIG. 4, the housing may comprise a cylinder shell 25 and a cylinder liner 26 disposed within the cylinder shell 25. The cylinder shell 25 and/or cylinder liner 26 may in whole or in part define a delivery chamber 21 which may be partly or fully swept by the piston 20. The piston 20 may comprise a piston body 22 and a piston rod 24. An upper face of the piston body 22 may define a piston face 23. The piston face 23 may comprise a flexible, non-porous, hydrophobic material, such as a polymer. The piston face 23 may typically comprise, or consists of, a polymer which is a polyester. The polyester preferably comprises, or consists of, polyethylene terephthalate. The cylinder liner 26 may comprise a material that is non-porous, smooth and chemically resistant. Examples include stainless steel, polyurethane and polyester.

The delivery chamber 21 typically has a displacement volume. The delivery chamber 21 is preferably a cylinder. Although the term "cylinder" implies a circular cross-section of a piston body and cylinder bore, the shape of the piston body 22 and cylinder bore may be dictated by the cross-sectional shape of the substrate 2. For example, when the substrate 2 is oval in cross-section, then the piston body 22 and cylinder bore are also oval in cross-section. It is preferred that the piston body 22, cylinder shell 25 and cylinder liner 26 have circular cross-sections.

The vacuum generator 6 may comprise an arrangement of the type described in EP 3 003 582 B1. As shown in FIG. 1, the vacuum generator 6 may comprise a flow cone 35 that may define a funnel that engages the upper end of the substrate 2. The flow come 35 generally has a wider end for receiving the upper end of the substrate 2. The inflatable upper seal bladder 10 may form a seal between the upper end of the substrate 2 and the flow cone 35. The vacuum generator 6 may comprise a vacuum pump connected to the flow cone by a conduit.

The fluid feed ring 5 is typically mounted below the substrate holder 3. The fluid feed ring 5 may be mounted at or above an upper end of the delivery chamber 21. The fluid feed ring 5 may be mounted in between the delivery chamber 21 and a lower part of the substrate holder 3.

Figure 2:
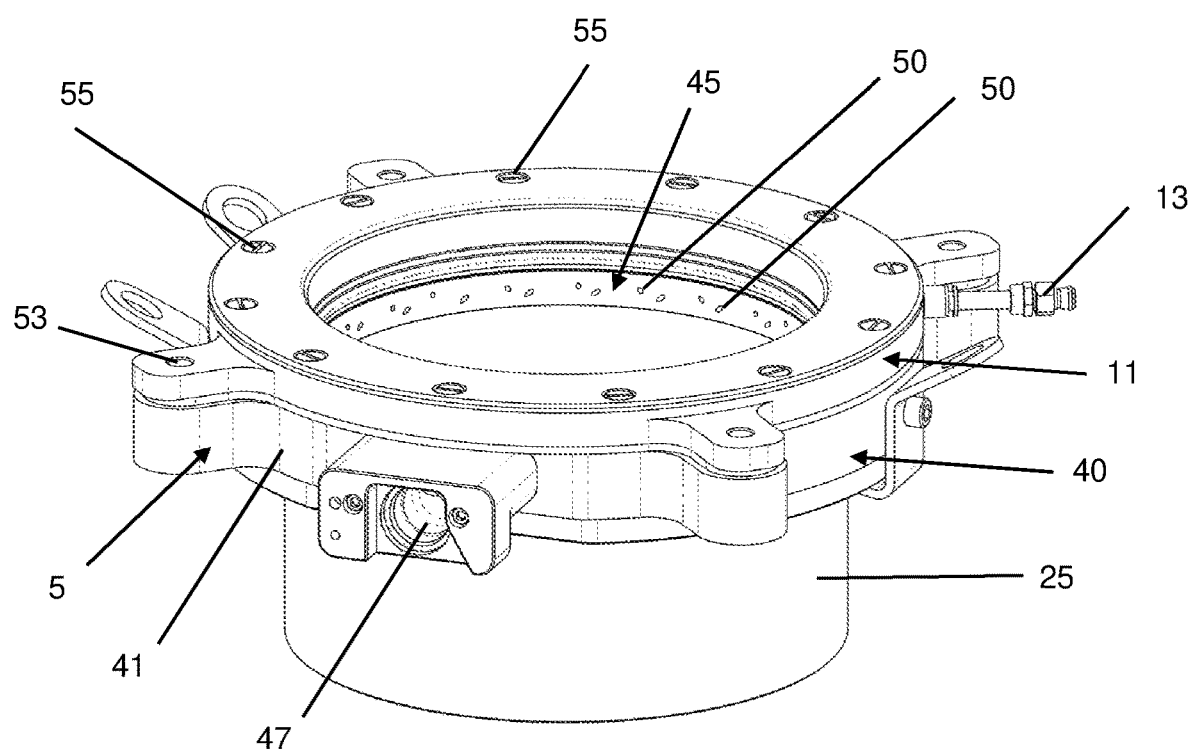
FIG. 2 is a perspective view of a sub-assembly of a substrate coating apparatus according to the present disclosure that comprises a fluid feed ring.
Figure 3:
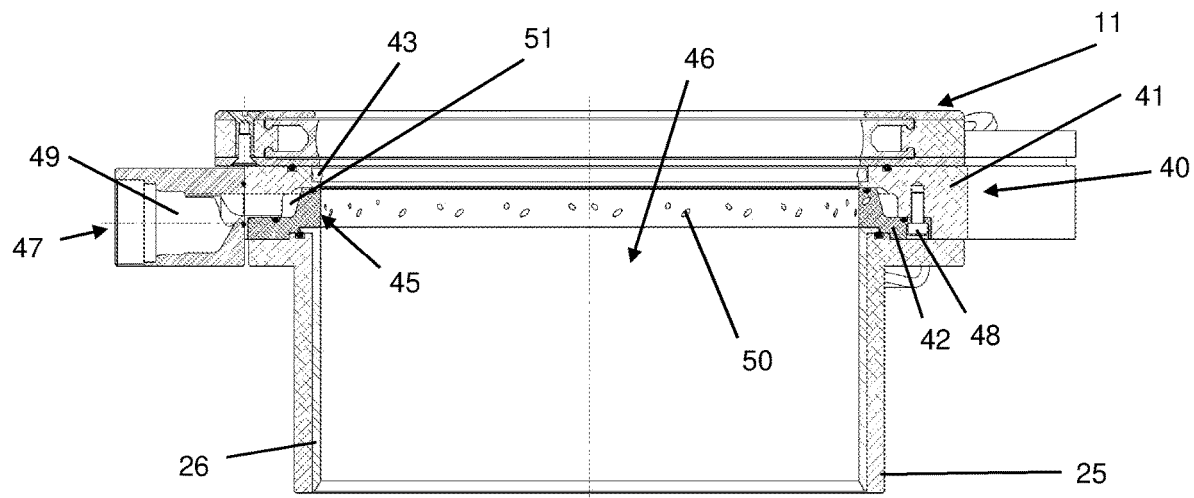
FIG. 3 is a cross-sectional view of the sub-assembly of FIG. 2.

As shown in FIGS. 2 to 4, the fluid feed ring 5 comprises an annular body 40 comprising an inner face 45 bounding a central bore 46 of the fluid feed ring 5. The fluid feed ring 5 further comprises a fluid feed port 47 for receiving the liquid, a plurality of outlet apertures 50 on the inner face 45 of the annular body 40 for discharging the liquid onto the piston face, and a distribution channel 51 extending at least part-way around the annular body 40 which provides fluid communication between the fluid feed port 47 and the plurality of outlet apertures 50.

Figure 6:
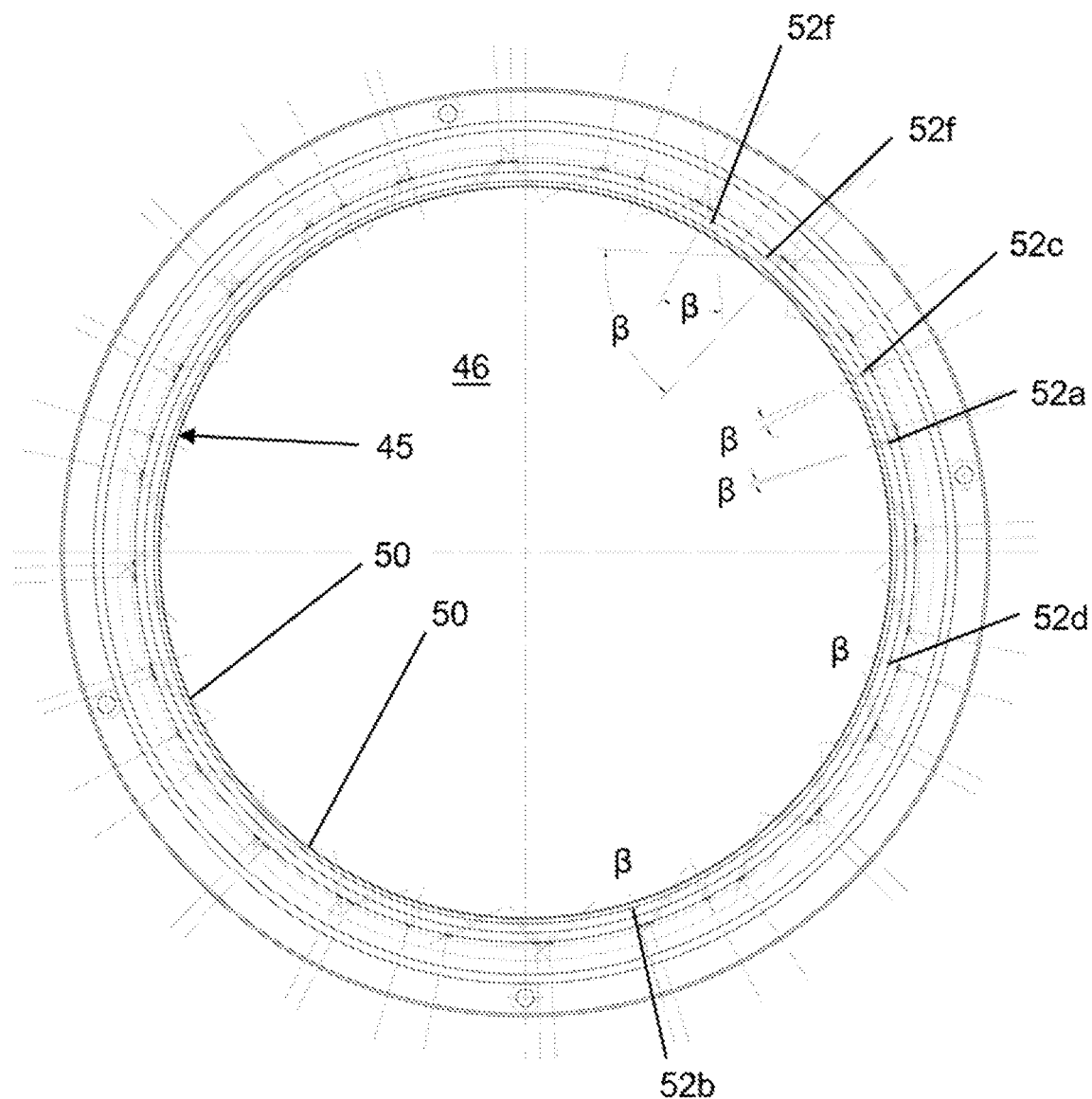
FIG. 6 is a plan view of a inner ring of the fluid feed ring of the substrate coating apparatus.
Figure 7:
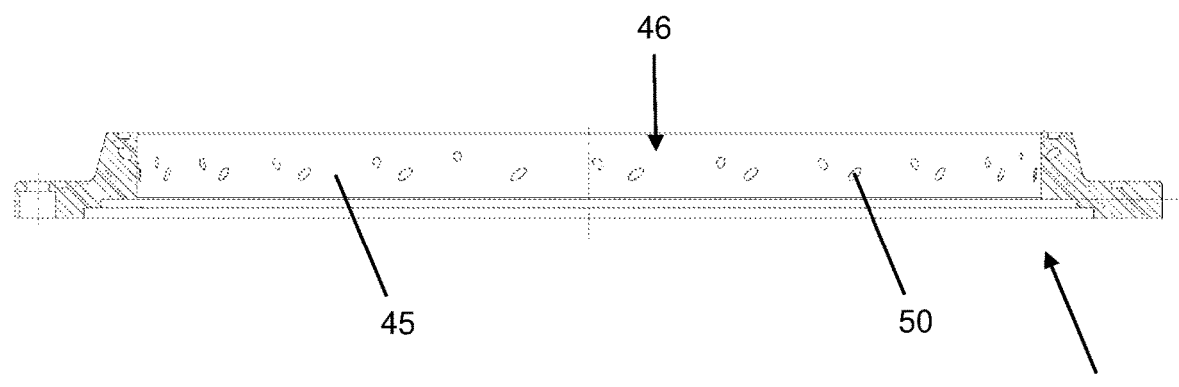
FIG. 7 is a cross-sectional view of the inner ring of FIG. 6.

The annular body 40 may be formed from a single part, for example a unitary casting or machined block. Alternatively, the annular body 40 may be formed from multiple parts, as shown in the example of FIG. 3, which are assembled together. For example, the annular body 40 may comprise a first part and a second part that are coupled together to define the distribution channel 51. The first part may be an outer ring 41. The outer ring 41 may define an outer wall of the distribution channel 51. The outer ring 41 may also define an upper wall of the distribution channel 51. The second part may be an inner ring 42, for example as shown in FIGS. 6 to 7. The inner ring 42 may define an inner wall of the distribution channel 51. The inner ring 42 may also define a lower wall of the distribution channel 51. The fluid feed ring 5 may comprise one or more seals for sealing the first part to the second part, for example O-ring seals 44. One or more fixtures may be provided to hold the multiple parts together, for example bolts 48 as visible in FIG. 3.

The annular body 40 may include an internal lip seal 43 as shown in FIG. 3 which may provide an additional fluid seal against the side wall of the substrate 2. The internal lip seal 43 may be retained on the base ring 41. The base ring 41 may comprise a recess for accommodating the internal lip seal 43.

Preferably the annular body 40 is substantially circular or circular. Alternative shapes may be used, for example where the cross-section of the substrate 2 is not circular.

The annular body 40 may comprise an upper face that extends from the inner face 45 and a lower face that extends from the inner face 45. The upper face and the lower face may be planar. An outer face may extend between the upper face and the lower face.

The fluid feed port 47 is preferably a single fluid feed port and may be located at a periphery of the fluid feed ring 5. The fluid feed port 47 may comprise a feed channel 49 that extends through the outer face of the annular body 40 into communication with the distribution channel 51.

As shown in FIG. 4, the fluid feed ring may further comprise one or more locating pins 53 for aligning the fluid feed ring 5 with a remainder of the substrate coating apparatus 1. The one or more locating pins 53 may extend from an upper face and/or a lower face of the annular body 40.

The annular body may have a range of internal diameters. For example, the internal diameters may be from 250 mm to 350 mm. Example internal diameters include 267 mm to 277 mm (10.5 inches), 305 mm (12 inches) and 330 mm (13 inches).

A plurality of fixings may be provided for coupling the fluid feed ring 5 to a remainder of the substrate coating apparatus 1. For example, as shown in FIG. 2, a plurality of vertical bolt holes may extend through the annular body 40 which are located radially outside the distribution channel 51 to receive fixing bolts 55.

The annular body 40 maybe formed of metal, preferably steel, more preferably stainless steel.

The distribution channel 51 may extend through two or more quadrants of the annular body 40, for example through greater than 90°. The distribution channel 51 may extend through three or more quadrants of the annular body 40, for example through greater than 180°. Preferably, the distribution channel 51 may extend through all four quadrants of the annular body 40, for example through greater than 270°. Most preferably the distribution channel 51 extends fully around the annular body 40, for example up to and including 360°.

The distribution channel 51 may comprise or consist of a bore within an interior of the annular body 40. Alternatively, the distribution channel 51 may comprise or consist of an open channel in a lower face of the annular body 40 which, in use, is mated against a complementary face of the substrate coating apparatus 1, for example a face of the piston arrangement 4. In this later case, the fluid feed ring 5 may further comprise one or more seals for sealing against the complementary face of the substrate coating apparatus 1, for example O-ring seals.

The plurality of outlet apertures 50 may be provided in at least two quadrants of the inner face 45; preferably in at least three quadrants of the inner face 45; most preferably in all four quadrants of the inner face 45. The plurality of outlet apertures 50 may be arranged around the full extent of the inner face 45 and may be equi-spaced around the full extent of the inner face 45.

There may be provided more than 25 outlet apertures 50, optionally more than 30 outlet apertures 50, optionally more than 40 outlet apertures 50, and optionally more than 50 outlet apertures 50. In some examples the plurality of outlet apertures 50 may consist of 28 apertures or 48 apertures or 60 apertures.

The fluid feed ring may further comprise a plurality of outlet channels 52 that provide fluid communication from the distribution channel 51 to the plurality of outlet apertures 50. Preferably, each outlet aperture 50 is supplied by a single outlet channel 52. The outlet channels 52 may be curved. Alternatively and preferably the outlet channels 52 may each be straight. The internal diameter of each outlet channel 52 may be from 1.0 to 3.0 mm, preferably from 1.5 to 3.0 mm, more preferably from 2.0 to 2.5 mm. The plurality of outlet channels 52 may all have the same internal diameter or alternatively portions of the plurality of outlet channels 52 may have different internal diameters.

At least a portion of, and optionally all of, the plurality of outlet channels 52 may be directed downwards at their respective outlet apertures 50 such that the liquid discharged from said outlet channels 52 through said outlet apertures 50 is directed downwards towards the piston face 23.

Said outlet channels 52 may be directed downwards at an angle $\alpha$ of 25° to 50° to the horizontal, optionally at an angle $\alpha$ of 30° to 45° to the horizontal, optionally at an angle $\alpha$ of 30° to 40° to the horizontal.

In some examples a first portion of said outlet channels 52 are directed downwards at a first angle $\alpha$ and a second portion of said outlet channels 52 are directed downwards at a second angle $\alpha$, and optionally a third portion of said outlet channels 52 are directed downwards at a third angle $\alpha$. For example, as shown in FIGS. 8a to 8f, outlet channels 52a and 52b are directed downwards at the first angle $\alpha$, the outlet channels 52e and 52f are directed downwards at the second angle $\alpha$, and the outlet channels 52c and 52d are directed downwards at the third angle $\alpha$.

The third angle $\alpha$ may be greater than the second angle $\alpha$, and optionally the second angle $\alpha$ may be greater than the first angle $\alpha$. In some examples the first angle $\alpha$ is 30°. In some examples the second angle $\alpha$ is 33σ. In some examples the third angle $\alpha$ is 37°.

In some examples the plurality of outlet channels 52 may be all either directed clockwise or all directed anti-clockwise at their respective outlet apertures 50 such that the liquid discharged from said outlet channels 52 through said outlet apertures 50 is all directed initially clockwise or all directed initially anti-clockwise onto the piston face 23. The plurality of outlet channels 52 may be directed at an angle $\beta$ of 10° to 40° to the radial direction, optionally at an angle $\beta$ of 10° to 35° to the radial direction. In some examples a first portion of said outlet channels 52 may be directed clockwise or anti-clockwise at a first angle $\beta$ to the radial direction and a second portion of said outlet channels 52 may be directed clockwise or anti-clockwise at a second angle $\beta$ to the radial direction. The first angle $\beta$ may be 10° to 15° to the radial direction, optionally 10° and/or the second angle β may be 30° to 40° to the radial direction, optionally 34°.

Figure 6A:
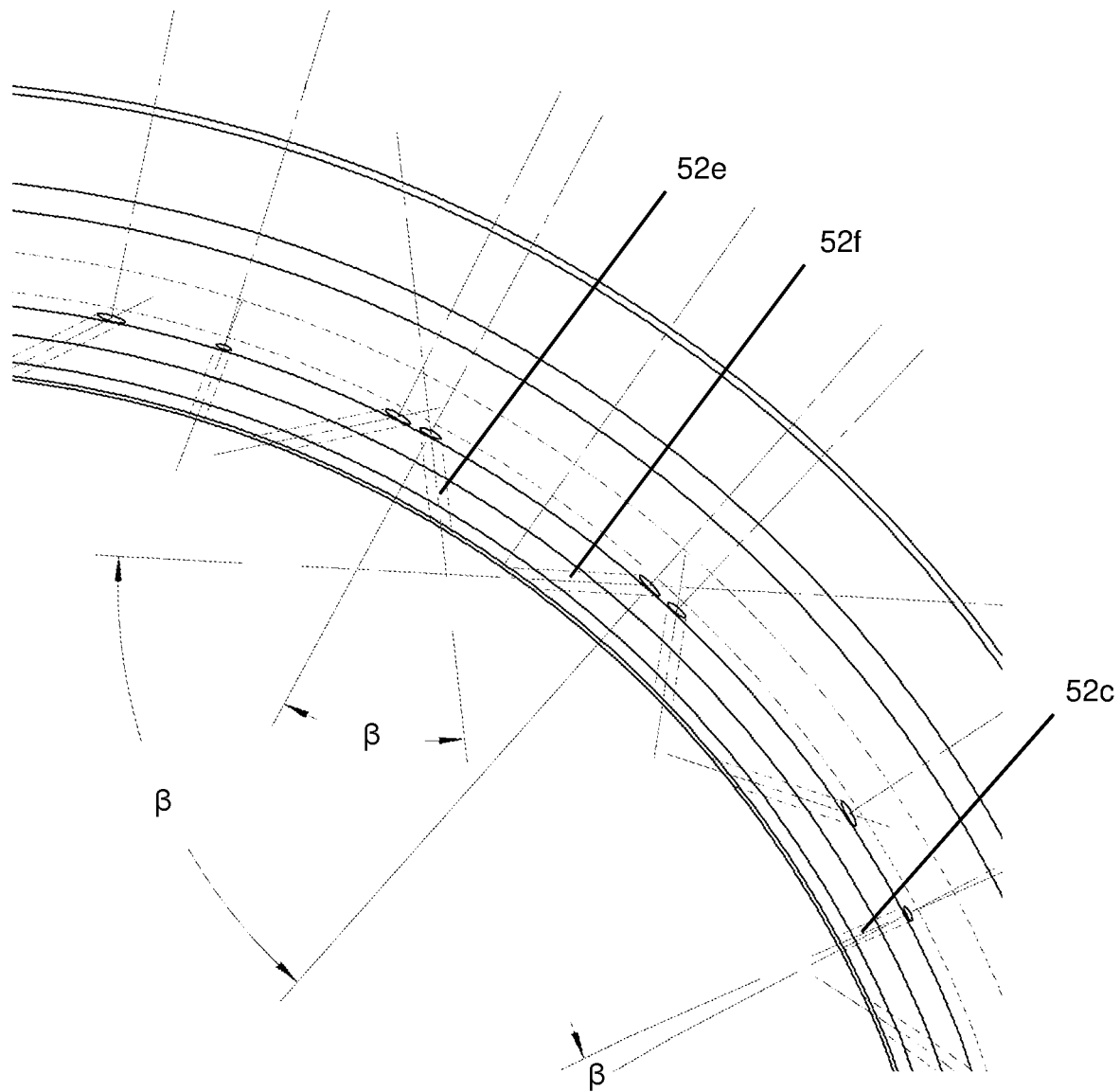
FIG. 6a is an enlarged view of a portion of FIG. 6.

In some examples a first subset of the plurality of outlet channels 52 may be directed clockwise at their respective outlet apertures 50 such that the liquid discharged from said outlet channels 52 through said outlet apertures 50 is directed initially clockwise onto the piston face 23. One such example is shown in FIGS. 6, 6a and 7. The first subset of the plurality of outlet channels 52 may be directed clockwise at one or more angles β selected from the range of 10° to 55° to the radial direction, optionally selected from the group of angles s of 10°, 34°, 35°, 52° to the radial direction.

A second subset of the plurality of outlet channels 52 may be directed anti-clockwise at their respective outlet apertures 50 such that the liquid discharged from said outlet channels 52 through said outlet apertures 50 is directed initially anti-clockwise onto the piston face 23. The second subset of the plurality of outlet channels 52 may be directed anti-clockwise at one or more angles β selected from the range of 10° to 55° to the radial direction, optionally selected from the group of angles β of 10°, 34°, 35°, 52° to the radial direction.

A third subset of the plurality of outlet channels 52 may be directed at an angle β from 0° to 10°, preferably 0° to 4° to the radial direction at their respective outlet apertures 50 such that the liquid discharged from said outlet channels 52 through said outlet apertures 50 is directed initially substantially radially onto the piston face 23.

The first subset of the plurality of outlet channels 52 that are directed clockwise may comprise or consist of one-quarter to one-half of the plurality of outlet channels 52. The second subset of the plurality of outlet channels 52 that are directed anti-clockwise may comprise or consist of one-quarter to one-half of the plurality of outlet channels 52. The third subset of the plurality of outlet channels 52 that are directed radially may comprise or consist of one-quarter to one-third of the plurality of outlet channels 52.

The first and/or second subsets of the plurality of outlet channels 52 that are directed clockwise or anti-clockwise may be directed to swirl initially in a peripheral zone 32 of the piston face 23.

The third subset of the plurality of outlet channels 52 that are directed at an angle from 0° to 10°, preferably 0° to 4° to the radial direction may comprise a first portion of said third subset which are directed downwards at a first angle α to target a central zone 30 of the piston face 23 and a second portion of said third subset which are directed downwards at a second angle α being greater than the first angle, to target an intermediate zone 31 of the piston face 23. The first angle α may be 25° to 35° to the horizontal, optionally 29°, 31° or 35° and/or the second angle α may be 35° to 50° to the horizontal, optionally 37° or 45°.

The distribution channel 51 at the location of intersection with the feed channel 49 may comprise a non-apertured section to thereby deflect sideways all of the liquid entering the distribution channel 51 from the feed channel 49.

In use the substrate coating apparatus 1 including the fluid feed ring 5 can be used to coat a substrate 2 being of the type comprising a plurality of channels. The method comprises:

(a) holding the substrate 2 vertically;
(b) supplying the liquid onto a face of a piston 20 using the fluid feed ring 5;
(c) introducing the liquid into the substrate 2 by pushing or injecting the liquid through open ends of the plurality of channels at a lower end of the substrate 2 with the piston 20; and
(d) after the lower end of the substrate 2 has been part-filled with the liquid, applying a vacuum to open ends of the plurality of channels at an upper end of the substrate 2 while introducing the liquid into the substrate in step (c).

The method of the present disclosure may be used to coat the substrate 2 with the liquid over the whole length of the channels or over only part of the length of the channels (i.e. less than the axial length of the channels).

In practice, the method of the disclosure is typically performed repeatedly, such as by using a substrate coating apparatus 1, like the apparatus described herein.

Typically, step (a) of the method comprises holding the substrate 2 vertically using the substrate holder 3. In general, step (a) of the method comprises holding the substrate 2 substantially vertically.

The substrate 2 can be manually or automatically inserted into the substrate holder 3. The substrate coating apparatus 1 may comprise a "pick-and-place" device (e.g. a robotic "pick-and-place" device) for inserting (e.g. automatically inserting) the substrate 2 into the substrate holder 3.

Typically, step (b) of the method comprises discharging the liquid into the delivery chamber 21 and onto the piston face 23 using the fluid feed ring 5 while the piston 20 is in the retracted (lowered) position. Typically, the liquid is supplied through the single fluid feed port 47 into the distribution channel 51. Upstream of the fluid feed port 47 there may be provided one or more of a storage vessel, a pump, a valve, a volumetric sensor, a weight/mass sensor for controlling the pre-determined quantity of liquid supplied onto the piston face 23 and/or the volumetric flow rate of the liquid.

The liquid entering the distribution channel 51 is diverted to flow around the distribution channel 51. All of the liquid may flow in one direction around the distribution channel 51. However, preferably, the liquid bifurcates and a portion of the liquid flows clockwise around the distribution channel 51 and a portion flows anti-clockwise around the distribution channel 51. The liquid may be supplied onto the piston face 23 from at least two quadrants of the fluid feed ring 5; optionally from at least three quadrants of the fluid feed ring 5; optionally from all four quadrants of the fluid feed ring 5.

The liquid exits the distribution channel 51 onto the piston face 23 through the plurality of outlet channels 52 and outlet apertures 50.

The discharge of the liquid through the plurality of outlet channels 52 and outlet apertures 50 may be directed downwards towards the piston face 23. The liquid may be directed downwards at an angle α of 25° to 50° to the horizontal, optionally at an angle α of 30° to 45° to the horizontal, optionally at an angle α of 30° to 40° to the horizontal.

A first portion of the liquid may be directed downwards at a first angle α and a second portion of the liquid may be directed downwards at a second angle α, and optionally a third portion of the liquid may be directed downwards at a third angle α. The first angle α may be greater than the second angle α, and optionally the third angle α may be greater than the second angle α.

In some examples the liquid may be all directed initially clockwise or all directed initially anti-clockwise onto the piston face, for example by angling all of the outlet channels 52 either clockwise or anti-clockwise. The liquid may be directed at an angle of 10 to 40° to the radial direction, optionally at an angle of 10° to 35° to the radial direction. A first portion of the liquid may be directed clockwise or anti-clockwise at a first angle and a second portion of the liquid may be directed clockwise or anti-clockwise at a second angle. The first angle may be 10° to 15° to the radial direction, optionally 10° and/or the second angle may be 30° to 40° to the radial direction, optionally 34°.

Figure 8A:
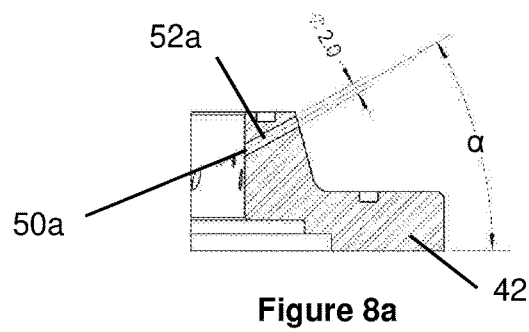
FIGS. 8a to 8f are further cross-sectional views of portions of the inner ring of FIG. 6.
Figure 8E:
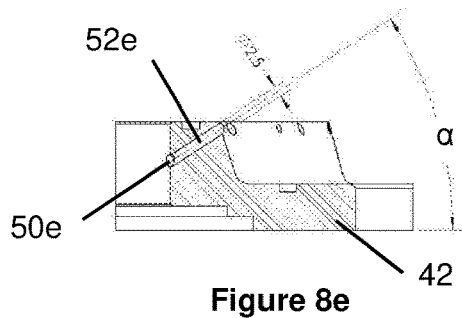
Figure 8B:
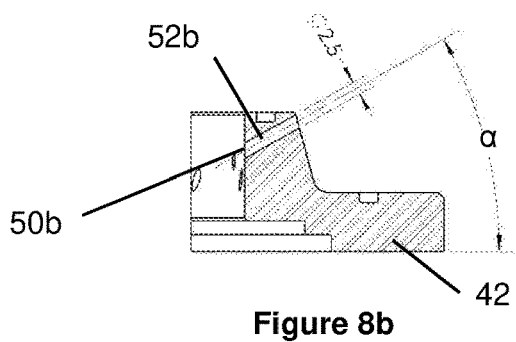
Figure 8F:
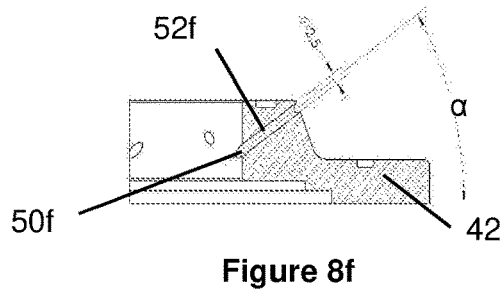
Figure 8C:
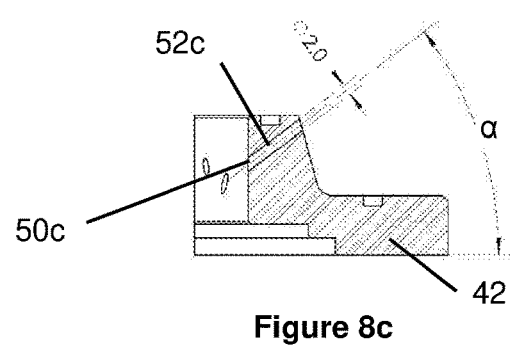
Figure 8D:
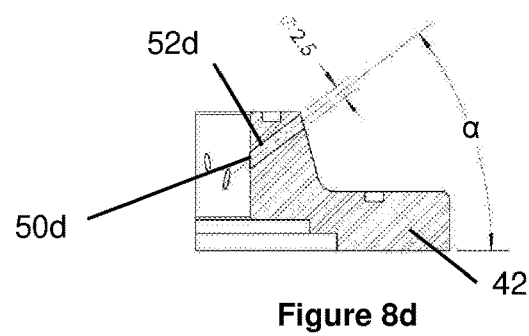

FIGS. 6 and 7 illustrate an alternative example where the liquid is directed in more than one direction onto the piston face 23. A first volume of the liquid may be directed initially clockwise onto the piston face 23 through outlet apertures 50*e* fed by outlet channels 52*e* as shown in FIG. 8*e*. Additionally or alternatively a second volume of the liquid may be directed initially anti-clockwise onto the piston face 23 through outlet apertures 50*f* fed by outlet channels 52*f* as shown in FIG. 8*f*. Additionally or alternatively a third volume of the liquid may be directed initially substantially radially onto the piston face 23 through outlet apertures 50*a* to 50*d* fed by outlet channels 52*a* to 52*d* as shown in FIG. 8*a* to 8*d*.

The first volume and/or the second volume of liquid may be directed to swirl initially in a peripheral zone 32 of the piston face 23.

A first portion of the third volume of the liquid which is directed initially radially onto the piston face 23 may be also directed downwards at a first angle α to target a central zone 30 of the piston face 23. Outlet apertures 50*a* and 50*b* fed by outlet channels 52*a* and 50*b* may be used and may be used for this function. A second portion of the third volume of the liquid which is directed initially radially onto the piston face 23 may be directed downwards at a second angle α, being greater than the first angle α, to target an intermediate zone 31 of the piston face 23. Outlet apertures 50*c* and 50*d* fed by outlet channels 52*c* and 50*d* may be used and may be used for this function. The first angle α may be 25° to 35° to the horizontal, optionally 29°, 31° or 35° and/or the second angle α may be 35° to 50° to the horizontal, optionally 37° or 45°.

In step (c) the liquid is introduced against gravity into the substrate 2 through the open ends of the channels at a lower end of the substrate 2 by pushing or injecting the liquid into the substrate 2. It has been found that introducing the liquid into the substrate against gravity assists in providing a wider washcoat processing window. The liquid can be uniformly coated onto the walls of the channels to a pre-determined length, where the difference between the coating lengths of the channels is 5 mm or less, typically 2 mm or less (e.g. 1 mm or less).

The liquid is preferably introduced into the substrate in a continuous manner (e.g. without pausing).

Typically, method step (c) comprises continuously introducing a pre-determined amount of the liquid into the substrate 2 through the open ends of the channels at a lower end of the substrate 2. The pre-determined amount may be a pre-determined volume and/or a pre-determined mass of the liquid.

The liquid is preferably introduced into the substrate 2 using the piston 20. The piston 20 may be used to rapidly push or inject the liquid up into the substrate 2.

Generally, the piston 20 reciprocates within the cylinder shell 25 and cylinder liner 26 between (i) a first position where the piston 20 is retracted and (ii) a second position where the piston 20, preferably a surface of the piston (i.e. the piston face 23), abuts a lower end of the substrate 2.

The retracted piston within the cylinder shell 25 and cylinder liner 26 defines a delivery chamber 21 having a displacement volume. Typically, the displacement volume is greater than or equal to the volume of the liquid to be introduced into the substrate 2. It is preferred that the displacement volume is similar to, or the same as, the pre-determined volume (i.e. the total volume) of liquid to be introduced into the substrate 2.

Generally all or substantially all of the liquid in the delivery chamber 21 is introduced into the substrate 2, such as when the piston 20 moves from the first position to the second position. The delivery chamber 21 is typically emptied when the entire volume of the liquid is introduced into the substrate 2, and the piston 20 abuts the lower end of the substrate 2.

In general, it is preferred that step (d) of the method comprises, after or when the lower end of the substrate 2 has been part-filled with the liquid, continuously applying a vacuum to the open ends of the channels at an upper end of the substrate 2 while introducing the liquid into the substrate 2, preferably until a pre-determined amount of the liquid has been introduced into the substrate 2. The vacuum may be continuously applied for 0.25 to 15 seconds, such as 0.5 to 10 seconds, preferably 1 to 7.5 seconds (e.g. 2 to 5 seconds).

After the liquid has been introduced into the substrate 2, the substrate 2 may be dried and/or calcined. Suitable drying and calcination conditions depend on the composition of the liquid and the type of substrate 2. Such conditions are known within the art.

The method and apparatus can be used to manufacture "zoned" or "layered" catalysts or coated substrates 2.

After drying and/or calcining a coated substrate 2, the method can be repeated, typically to coat a monolithic substrate with a second liquid comprising a catalyst component. After a first pass, the same substrate 2 can be coated in a second pass with a different liquid. The second liquid typically has a different composition to the first liquid that was applied to or introduced into the substrate 2. The second liquid can be introduced into the substrate 2 from the same end as the first liquid. Alternatively, the second liquid can be introduced into the substrate 2 from the opposite end to the first liquid. Such a method is particularly useful for coating a filtering monolithic substrate, such as a wall-flow filter.

Substrates for emissions control devices are well known in the art and generally any such substrate 2 may be used in the method or with the apparatus of the invention. The substrate 2 may be a partial filter substrate (see, for example, the partial filter substrates disclosed in WO 01/80978 or EP 1 057 519). Typically, a partial filter substrate has a collecting element (e.g. for particulate matter, such as soot particles) and a plurality of channels (i.e. for exhaust gas to flow through), wherein each channel has at least one open end (preferably each channel has two open ends (i.e. each channel has both ends open)).

In general, the partial filter substrate has a plurality of walls that define the boundaries of the channels. Typically, the collecting element is a plurality of deflections in the plurality of the walls. Each wall may have no deflections or one or more deflections. Each deflection acts as an obstruction to any particulate matter in the exhaust gas that flows through the substrate. Each deflection may have a flap or a wing-like shape and, typically, each deflection projects outwards from (e.g. at an angle to) the plane of the wall. It is preferred that each deflection is combined with an opening in a wall of the substrate. Each opening in a wall allows the exhaust gas to flow from one channel to a neighbouring channel.

In general, it is preferred that the substrate 2 is a monolithic substrate. The term "monolithic substrate" as used herein refers to a substrate having a plurality of channels that extend longitudinally along the length of the substrate 2, wherein each channel has at least one open end (i.e. for exhaust gas to flow through). The monolithic substrate may be a flow-through monolithic substrate. The monolithic may be a filtering monolithic substrate, such as a wall-flow filter.

Generally, the substrate 2 is a ceramic material or a metallic material. When the substrate 2 is a ceramic material, then typically the ceramic material may be selected from the group consisting of silicon carbide (SIC), aluminium nitride, silicon nitride, aluminium titanate, alumina, cordierite ($SiO_2$-$Al_2O_3$-MgO), mullite, pollucite and a thermet (e.g. $Al_2O_3$/Fe, $Al_2O_3$/Ni or $B_4C$/Fe, or composites comprising segments of any two or more thereof).

When the substrate 2 is a metallic material, then typically the metallic material is selected from the group consisting of Fe—Cr—Al alloy, Ni—Cr—Al alloy and a stainless steel alloy.

Definitions

The term "vertically" used herein with reference to holding the substrate 2 or the substrate holder refers to an arrangement where the central axis of the substrate 2 is ±5° from the vertical, preferably ±3° from the vertical, such as ±0° from the vertical (i.e. perfectly vertical within measurement error).

The term "downwards" as used herein with reference to the direction of the outlet channels 52 or direction of the liquid discharged from the outlet apertures 50 refers to a direction from higher to lower, in particular in a direction of decreasing gravitational potential energy.

The terms "clockwise" and "anti-clockwise" as used herein with reference to the direction of the outlet channels 52 or direction of the liquid discharged from the outlet apertures 50 refers to rotation about a central vertical axis of the substrate coating apparatus 1 when viewed in a downwards direction from above the substrate coating apparatus 1.

Any angle referred to as "to the radial direction" as used herein with reference to the direction of the outlet channels 52 or direction of the liquid discharged from the outlet apertures 50 refers to the angle measured, in the horizontal plane and at the outlet aperture 50, between a radial line extending from the outlet aperture 50 to a centre of the annular body 40 and a line projecting from the outlet aperture 50 along the axis of the outlet channel 52 into an interior of the annular body 40.

Any reference to a "vacuum" as used herein refers to a pressure that is below atmospheric pressure. The term "vacuum" is not to be interpreted in its literal sense of a space that is completely devoid of matter. The strength of the vacuum that is applied to the substrate 2 will depend on the composition of the liquid and the type of substrate 2 that is being used. The vacuum should be strong enough to clear the cells of the substrate 2 so that there are no blockages. Such vacuum strengths or reduced pressures are well known in the art.

The term "pre-determined amount" as used herein refers to a total amount of the liquid for introduction into the substrate 2 that is sufficient to obtain a specific product characteristic, such as a desired coating specification. The amount is "pre-determined" in the sense that it is determined off-line in routine experiments to find out the total amount of the liquid that is needed to achieve the desired product characteristics. Such pre-determined amounts can readily be determined and may be known from using other methods or apparatus for coating substrates in the art (e.g. see WO 99/47260 and WO 2011/080525).

The term "substantially all" as used herein with reference to the amount of liquid in the delivery chamber that is introduced into the substrate refers to 99% or more (e.g. 99.5% or more) of the liquid by volume or by weight, preferably by volume.

EXAMPLES

Example configurations of the fluid feed ring 5 are summarised in the following Table:

|  | Total no. of outlet apertures | Clockwise outlet apertures | Anti-clockwise outlet apertures | Radial outlet apertures | Internal diameter (mm) |
| --- | --- | --- | --- | --- | --- |
| Example 1 | 48 | 12 | 24 | 12 | 267 mm to 277 mm (10.5 inches) |
| Example 2 | 28 | 0 | 28 | 0 | 330 mm (13 inches) |
| Example 3 | 28 | 28 | 0 | 0 | 330 mm (13 inches) |
| Example 4 | 60 | 20 | 20 | 20 | 305 mm (12 inches) |

Further aspects and embodiments of the present disclosure are set out in the following clauses:

Clause 1. A fluid feed ring for supplying a liquid comprising a catalyst component onto a piston face of a substrate coating apparatus, the fluid feed ring comprising:

an annular body comprising an inner face bounding a central bore of the fluid feed ring;

a fluid feed port for receiving the liquid;

a plurality of outlet apertures on the inner face of the annular body for discharging the liquid onto the piston face; and a distribution channel extending at least part-way around the annular body which provides fluid communication between the fluid feed port and the plurality of outlet apertures.

Clause 2. The fluid feed ring of clause 1, wherein the plurality of outlet apertures are provided in at least two quadrants of the inner face; optionally in at least three quadrants of the inner face; optionally in all four quadrants of the inner face.

Clause 3. The fluid feed ring of clause 1 or clause 2, wherein the plurality of outlet apertures are arranged around the full extent of the inner face; optionally wherein the plurality of apertures are equi-spaced around the full extent of the inner face.

Clause 4. The fluid feed ring of any one of clauses 1 to 3, wherein the plurality of apertures comprises more than 25 apertures, optionally more than 30 apertures, optionally more than 40 apertures, optionally more than 50 apertures, optionally wherein the plurality of apertures consists of 28 apertures or 48 apertures or 60 apertures.

Clause 5. The fluid feed ring of any one of clauses 1 to 4, further comprising a plurality of outlet channels that provide fluid communication from the distribution channel to the plurality of outlet apertures; and optionally wherein the plurality of outlet channels have an internal diameter from 1.0 to 3.0 mm, preferably from 1.5 to 3.0 mm, more preferably from 2.0 to 2.5 mm.

Clause 6. The fluid feed ring of clause 5, wherein at least a portion of, and optionally all of, the plurality of outlet channels are directed downwards at their respective outlet apertures such that the liquid discharged from said outlet channels through said outlet apertures is directed downwards towards the piston face.

Clause 7. The fluid feed ring of clause 6, wherein said outlet channels are directed downwards at an angle of 25° to 50° to the horizontal, optionally at an angle of 30° to 45° to the horizontal, optionally at an angle of 30° to 40° to the horizontal.

Clause 8. The fluid feed ring of clause 6 or clause 7, wherein a first portion of said outlet channels are directed downwards at a first angle and a second portion of said outlet channels are directed downwards at a second angle, and optionally a third portion of said outlet channels are directed downwards at a third angle.

Clause 9. The fluid feed ring of clause 8, wherein the third angle is greater than the second angle, and optionally the second angle is greater than the first angle.

Clause 10. The fluid feed ring of any one of clauses 1 to 9, wherein the plurality of outlet channels are all either directed clockwise or all directed anti-clockwise at their respective outlet apertures such that the liquid discharged from said outlet channels through said outlet apertures is all directed initially clockwise or all directed initially anti-clockwise onto the piston face.

Clause 11. The fluid feed ring of clause 10, wherein the plurality of outlet channels are directed at an angle of 10° to 40° to the radial direction, optionally at an angle of 10° to 35° to the radial direction.

Clause 12. The fluid feed ring of clause 10 or clause 11, wherein a first portion of said outlet channels are directed clockwise or anti-clockwise at a first angle to the radial direction and a second portion of said outlet channels are directed clockwise or anti-clockwise at a second angle to the radial direction.

Clause 13. The fluid feed ring of clause 12, wherein the first angle is 10° to 15° to the radial direction, optionally 10° and/or the second angle is 30° to 40° to the radial direction, optionally 34°.

Clause 14. The fluid feed ring of any one of clauses 1 to 9, wherein a first subset of the plurality of outlet channels are directed clockwise at their respective outlet apertures such that the liquid discharged from said outlet channels through said outlet apertures is directed initially clockwise onto the piston face.

Clause 15. The fluid feed ring of clause 14, wherein the first subset of the plurality of outlet channels is directed clockwise at one or more angles selected from the range of 10° to 55° to the radial direction, optionally selected from the group of angles of 10°, 34°, 35°, 52° to the radial direction.

Clause 16. The fluid feed ring of any one of clauses 1 to 9 or 14 to 15, wherein a second subset of the plurality of outlet channels are directed anti-clockwise at their respective outlet apertures such that the liquid discharged from said outlet channels through said outlet apertures is directed initially anti-clockwise onto the piston face.

Clause 17. The fluid feed ring of clause 16, wherein the second subset of the plurality of outlet channels is directed anti-clockwise at one or more angles selected from the range of 10° to 55° to the radial direction, optionally selected from the group of angles of 10°, 34°, 35°, 52° to the radial direction.

Clause 18. The fluid feed ring of any one of clauses 1 to 9 or 14 to 17, wherein a third subset of the plurality of outlet channels are directed at an angle from 0° to 10°, preferably 0° to 4° to the radial direction at their respective outlet apertures such that the liquid discharged from said outlet channels through said outlet apertures is directed initially substantially radially onto the piston face.

Clause 19. The fluid feed ring of any one of clauses 14 to 18, wherein the first subset of the plurality of outlet channels that are directed clockwise comprises one-quarter to one-half of the plurality of outlet channels.

Clause 20. The fluid feed ring of any one of clauses 16 to 19, wherein the second subset of the plurality of outlet channels that are directed anti-clockwise comprises one-quarter to one-half of the plurality of outlet channels.

Clause 21. The fluid feed ring of any one of clauses 18 to 20, wherein the third subset of the plurality of outlet channels that are directed radially comprises one-quarter to one-third of the plurality of outlet channels.

Clause 22. The fluid feed ring of any one of clauses 14 to 21, wherein the first and/or second subsets of the plurality of outlet channels that are directed clockwise or anti-clockwise are directed to swirl initially in a peripheral zone of the piston face.

Clause 23. The fluid feed ring of any one of clauses 18 to 22, wherein the third subset of the plurality of outlet channels that are directed at an angle from 0° to 10°, preferably 0° to 4° to the radial direction comprises a first portion of said third subset which are directed downwards at a first angle to target a central zone of the piston face and a second portion of said third subset which are directed downwards at a second angle, being greater than the first angle, to target an intermediate zone of the piston face.

Clause 24. The fluid feed ring of clause 23, wherein the first angle is 25° to 35° to the horizontal, optionally 29°, 31° or 35° and/or the second angle is 35° to 50° to the horizontal, optionally 37° or 45°.

Clause 25. The fluid feed ring of any one of clauses 1 to 24, wherein the distribution channel extends fully around the annular body.

Clause 26. The fluid feed ring of any one of clauses 1 to 25, wherein the annular body comprises a first part and a second part that are coupled together to define the distribution channel.

Clause 27. The fluid feed ring of clause 26, further comprising one or more seals for sealing the first part to the second part.

Clause 28. The fluid feed ring of clause 27, wherein the one or more seals comprise O-ring seals.

Clause 29. The fluid feed ring of any one of clauses 1 to 28, wherein the distribution channel comprises a bore within an interior of the annular body.

Clause 30. The fluid feed ring of any one of clauses 1 to 28, wherein the distribution channel comprises an open channel in a lower face of the annular body which, in use, is mated against a complementary face of the substrate coating apparatus.

Clause 31. The fluid feed ring of clause 30, further comprising one or more seals for sealing against the complementary face of the substrate coating apparatus.

Clause 32. The fluid feed ring of clause 31, wherein the one or more seals comprise O-ring seals.

Clause 33. The fluid feed ring of any one of clauses 1 to 32, wherein the annular body is substantially circular or circular.

Clause 34. The fluid feed ring of any one of clauses 1 to 33, wherein the annular body comprises an upper face that extends from the inner face and a lower face that extends from the inner face.

Clause 35. The fluid feed ring of clause 34, wherein the upper face and the lower face are planar.

Clause 36. The fluid feed ring of any one of clauses 34 to 35, further comprising an outer face extending between the upper face and the lower face.

Clause 37. The fluid feed ring of any one of clauses 1 to 36, wherein the fluid feed port is a single fluid feed port.

Clause 38. The fluid feed ring of any one of clauses 1 to 37, wherein the fluid feed port is located at a periphery of the fluid feed ring.

Clause 39. The fluid feed ring of any one of clauses 1 to 38, wherein the fluid feed port comprises a feed channel that extends through an outer face of the annular body into communication with the distribution channel.

Clause 40. The fluid feed ring of any one of clauses 1 to 39, wherein the distribution channel at the location of intersection with the feed channel comprises a non-apertured section to thereby deflect sideways all of the liquid entering the distribution channel from the feed channel.

Clause 41. The fluid feed ring of any one of clauses 1 to 40, further comprising one or more locating pins for aligning the fluid feed ring with the substrate coating apparatus.

Clause 42. The fluid feed ring of clause 41, wherein the one or more locating pins extend from an upper face and/or a lower face of the annular body.

Clause 43. The fluid feed ring of any one of clauses 1 to 42, wherein the annular body has an internal diameter of 250 mm to 350 mm, optionally an internal diameter of 267 mm to 277 mm (10.5 inches), 305 mm (12 inches) or 330 mm (13 inches).

Clause 44. The fluid feed ring of any one of clauses 1 to 43, wherein the annular body comprises a plurality of fixing apertures for coupling the fluid feed ring to the substrate coating apparatus, optionally wherein the plurality of fixing apertures comprises a plurality of vertical bolt holes extending through the annular body and arranged radially outside the distribution channel.

Clause 45. The fluid feed ring of any one of clauses 1 to 44, wherein the annular body is formed of metal, optionally steel, optionally stainless steel.

Clause 46. A substrate coating apparatus comprising:

a substrate holder for holding a substrate vertically, the substrate being of the type comprising a plurality of channels;

a piston for introducing, by pushing or injecting, a liquid comprising a catalyst component into the substrate via or through open ends of the plurality of channels at a lower end of the substrate;

a vacuum generator for applying a vacuum to open ends of the plurality of channels at an upper end of the substrate; and a fluid feed ring according to any one of clauses 1 to 45 for supplying the liquid onto a face of the piston.

Clause 47. The substrate coating apparatus of clause 46, wherein the fluid feed ring is mounted below the substrate holder for holding the substrate vertically.

Clause 48. The substrate coating apparatus of clause 46 or clause 47, wherein the piston is reciprocally movable within a delivery chamber and the fluid feed ring is mounted at or above an upper end of the delivery chamber.

Clause 49. The substrate coating apparatus of clause 48, wherein the fluid feed ring is mounted in between the delivery chamber and a lower part of the substrate holder for holding a substrate vertically.

Clause 50. A method of coating a substrate with a liquid comprising a catalyst component, the substrate being of the type comprising a plurality of channels, the method comprising:

(a) holding the substrate vertically;

(b) supplying the liquid onto a face of a piston using the fluid feed ring of any one of clauses 1 to 45;

(c) introducing the liquid into the substrate by pushing or injecting the liquid through open ends of the plurality of channels at a lower end of the substrate with the piston; and (d) after the lower end of the substrate has been part-filled with the liquid, applying a vacuum to open ends of the plurality of channels at an upper end of the substrate while introducing the liquid into the substrate in step (c).

Clause 51. The method of clause 50, wherein, in step (b) the liquid is supplied from at least two quadrants of the fluid feed ring; optionally from at least three quadrants of the fluid feed ring; optionally from all four quadrants of the fluid feed ring.

Clause 52. The method of clause 50 or clause 51, wherein, in step (b) the liquid is directed downwards towards the piston face.

Clause 53. The method of clause 52, wherein the liquid is directed downwards at an angle of 25° to 50° to the horizontal, optionally at an angle of 30° to 45° to the horizontal, optionally at an angle of 30° to 40° to the horizontal.

Clause 54. The method of clause 52 or clause 53, wherein a first portion of the liquid is directed downwards at a first angle and a second portion of the liquid is directed downwards at a second angle, and optionally a third portion of the liquid is directed downwards at a third angle.

Clause 55. The method of clause 54, wherein the first angle is greater than the second angle, and optionally the third angle is greater than the second angle.

Clause 56. The method of any one of clauses 50 to 56, wherein, in step (b) the liquid is all directed initially clockwise or all directed initially anti-clockwise onto the piston face.

Clause 57. The method of clause 56, wherein the liquid is directed at an angle of 10° to 40° to the radial direction, optionally at an angle of 10° to 35° to the radial direction.

Clause 58. The method of any one of clauses 50 to 57, wherein, in step (b) a first portion of the liquid is directed clockwise or anti-clockwise at a first angle and a second portion of the liquid is directed clockwise or anti-clockwise at a second angle.

Clause 59. The method of clause 58, wherein the first angle is 10° to 15° to the radial direction, optionally 10° and/or the second angle is 30° to 40° to the radial direction, optionally 34°.

Clause 60. The method of any one of clauses 50 to 55, wherein a first volume of the liquid is directed initially clockwise onto the piston face.

Clause 61. The method of any one of clauses 50 to 55 or clause 60, wherein a second volume of the liquid is directed initially anti-clockwise onto the piston face.

Clause 62. The method of any one of clauses 50 to 55 or 60 to 61, wherein a third volume of the liquid is directed initially substantially radially onto the piston face.

Clause 63. The method of any one of clauses 60 to 62, wherein the first volume and/or the second volume of liquid are directed to swirl initially in a peripheral zone of the piston face.

Clause 64. The method of any one of clauses 62 to 63, wherein a first portion of the third volume of the liquid which is directed initially radially onto the piston face is also directed downwards at a first angle to target a central zone of the piston face and a second portion of the third volume of the liquid which is directed initially radially onto the piston face is directed downwards at a second angle, being greater than the first angle, to target an intermediate zone of the piston face.

Clause 65. The method of clause 64, wherein the first angle is 25° to 35° to the horizontal, optionally 29°, 31° or 35° and/or the second angle is 35° to 50° to the horizontal, optionally 37° or 45°.

The invention claimed is:

1. A fluid feed ring for supplying a liquid comprising a catalyst component onto a piston face of a substrate coating apparatus, the fluid feed ring comprising:
   an annular body comprising an inner face bounding a central bore of the fluid feed ring;
   a fluid feed port for receiving the liquid;
   a plurality of outlet apertures on the inner face of the annular body for discharging the liquid onto the piston face; and
   a distribution channel extending at least part-way around the annular body which provides fluid communication between the fluid feed port and the plurality of outlet apertures.

2. The fluid feed ring of claim 1, wherein the plurality of outlet apertures are provided in at least two quadrants of the inner face; optionally wherein the plurality of outlet apertures are provided in at least three quadrants of the inner face; optionally wherein the plurality of outlet apertures are provided in all four quadrants of the inner face; and optionally wherein the plurality of outlet apertures are arranged around a full extent of the inner face; and optionally wherein the plurality of apertures are equi-spaced around a full extent of the inner face.

3. The fluid feed ring of claim 1, further comprising a plurality of outlet channels that provide fluid communication from the distribution channel to the plurality of outlet apertures; and optionally wherein at least a portion of, and optionally all of, the plurality of outlet channels are directed downwards at their respective outlet apertures of the plurality of outlet apertures such that the liquid discharged from said plurality of outlet channels through said plurality of outlet apertures is directed downwards towards the piston face; and optionally wherein a first portion of said plurality of outlet channels are directed downwards at a first angle and a second portion of said plurality of outlet channels are directed downwards at a second angle, and optionally a third portion of said plurality of outlet channels are directed downwards at a third angle.

4. The fluid feed ring of claim 3, wherein the plurality of outlet channels are all either directed clockwise or all directed anti-clockwise at their respective outlet apertures of the plurality of outlet apertures such that the liquid discharged from said plurality of outlet channels through said plurality of outlet apertures is all directed initially clockwise or all directed initially anti-clockwise onto the piston face.

5. The fluid feed ring of claim 4, wherein a first portion of said plurality of outlet channels are directed clockwise or anti-clockwise at a first angle to a radial direction and a second portion of said plurality of outlet channels are directed clockwise or anti-clockwise at a second angle to the radial direction.

6. The fluid feed ring of claim 3, wherein a first subset of the plurality of outlet channels are directed clockwise at their respective outlet apertures of the plurality of outlet apertures such that the liquid discharged from said first subset of the plurality of outlet channels through said plurality of outlet apertures is directed initially clockwise onto the piston face.

7. The fluid feed ring of claim 6, wherein a second subset of the plurality of outlet channels are directed anti-clockwise at their respective outlet apertures of the plurality of outlet apertures such that the liquid discharged from said second subset of the plurality of outlet channels through said plurality of outlet apertures is directed initially anti-clockwise onto the piston face.

8. The fluid feed ring of claim 7, wherein a third subset of the plurality of outlet channels are directed at an angle from 0° to 10° to a radial direction at their respective outlet apertures of the plurality of outlet apertures such that the liquid discharged from said third subset of the plurality of outlet channels through said plurality of outlet apertures is directed initially radially onto the piston face.

9. The fluid feed ring of claim 7, wherein the first and/or second subsets of the plurality of outlet channels that are directed clockwise or anti-clockwise are directed to swirl initially in a peripheral zone of the piston face.

10. The fluid feed ring of claim 8, wherein the third subset of the plurality of outlet channels that are directed at the angle from 0° to 10° to the radial direction comprises a first portion of said third subset of the plurality of outlet channels which are directed downwards at a first angle to target a central zone of the piston face and a second portion of said third subset of the plurality of outlet channels which are directed downwards at a second angle, the second angle being greater than the first angle, to target an intermediate zone of the piston face.

11. The fluid feed ring of claim 1, wherein the fluid feed port is located at a periphery of the fluid feed ring; and wherein the fluid feed port comprises a feed channel that extends through an outer face of the annular body into communication with the distribution channel; and optionally wherein the distribution channel at the location of intersection with the feed channel comprises a non-apertured section to thereby deflect sideways all of the liquid entering the distribution channel from the feed channel.

* * * * *